United States Patent
Yang et al.

(10) Patent No.: US 10,095,355 B2
(45) Date of Patent: Oct. 9, 2018

(54) INVERTING CIRCUIT, DRIVING METHOD THEREOF, TOUCH DISPLAY PANEL AND TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Hailin Xue, Beijing (CN); Xiaochuan Chen, Beijing (CN); Yingming Liu, Beijing (CN); Lingyu Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 134 days.

(21) Appl. No.: 15/159,150

(22) Filed: May 19, 2016

(65) Prior Publication Data

US 2017/0083155 A1 Mar. 23, 2017

(30) Foreign Application Priority Data

Sep. 18, 2015 (CN) .......................... 2015 1 0599197

(51) Int. Cl.
*G09G 3/20* (2006.01)
*G06F 3/041* (2006.01)
(Continued)

(52) U.S. Cl.
CPC ............ *G06F 3/0418* (2013.01); *G06F 3/044* (2013.01); *G06F 3/045* (2013.01); *G06F 3/0412* (2013.01);
(Continued)

(58) Field of Classification Search
None
See application file for complete search history.

(56) References Cited

U.S. PATENT DOCUMENTS 9,007,537 B2  4/2015 Tun et al.
9,105,234 B2  8/2015 Kim et al.
(Continued)

FOREIGN PATENT DOCUMENTS

CN  102147674 A  8/2011
CN  102708795 A  10/2012
(Continued)

OTHER PUBLICATIONS

First Office Action dated Apr. 5, 2017 in corresponding Chinese Application No. 201510599197.X.
(Continued)

*Primary Examiner* — Carl Adams
(74) *Attorney, Agent, or Firm* — Nath, Goldberg & Meyer; Joshua B. Goldberg (57) ABSTRACT

The present invention discloses an inverting circuit, a driving method thereof, a touch display panel and a touch display device. The inverting circuit includes an input module and an output module, the input module is used for controlling a potential of the first node, and the output module is used for controlling, under the control of the potential of the first node, an output signal of the first output terminal according to input signals of the first input terminal, the third voltage terminal and the third signal terminal. In the technical solutions provided by the present invention, a light-emitting control signal is switched off in a touch stage by means of time-sharing driving to lower the capacitance to ground of the touch electrode, so that resistive and capacitive load of the touch electrode is reduced, touch driving frequency is increased, and touch accuracy is thus improved.

13 Claims, 8 Drawing Sheets

(51) Int. Cl.
*G06F 3/044* (2006.01)
*G06F 3/045* (2006.01)
*G09G 3/3266* (2016.01)
*G09G 3/3283* (2016.01)
*G09G 3/3258* (2016.01)

(52) U.S. Cl.
CPC ......... *G09G 3/3258* (2013.01); *G09G 3/3266* (2013.01); *G09G 3/3283* (2013.01); *G09G 2300/0809* (2013.01); *G09G 2310/0291* (2013.01)

(56) References Cited

U.S. PATENT DOCUMENTS

| | | | |
|---|---|---|---|
| 9,311,849 | B2 | 4/2016 | Qian |
| 9,584,127 | B2 | 2/2017 | Qian et al. |
| 9,647,042 | B2 | 5/2017 | Li et al. |
| 2009/0289920 | A1 | 11/2009 | Chiang et al. |
| 2011/0195247 | A1 | 8/2011 | Hwang et al. |
| 2016/0105184 | A1* | 4/2016 | Qian ............... H03K 19/0944 345/214 |

FOREIGN PATENT DOCUMENTS

| | | |
|---|---|---|
| CN | 102819371 A | 12/2012 |
| CN | 102820007 A | 12/2012 |
| CN | 103268749 A | 8/2013 |
| CN | 103354079 A | 10/2013 |
| CN | 103984442 A | 8/2014 |
| CN | 104269137 A | 1/2015 |
| CN | 104269142 A | 1/2015 |
| CN | 104576704 A | 4/2015 |
| CN | 104850270 A | 8/2015 |
| JP | 2005-143068 A | 6/2005 |

OTHER PUBLICATIONS

Third Office Action dated May 16, 2018 corresponding to Chinese application No. 201510599197.X.

* cited by examiner

INVERTING CIRCUIT, DRIVING METHOD THEREOF, TOUCH DISPLAY PANEL AND TOUCH DISPLAY DEVICE

FIELD OF THE INVENTION

The present invention relates to the field of touch display technology, and particularly relates to an inverting circuit, a driving method thereof, a touch display panel, and a touch display device.

BACKGROUND OF THE INVENTION

In an existing touch display panel, a touch-control structure is integrated into a display panel, so that the display panel itself has a touch-control function. However, a touch electrode of the foregoing touch display panel has high capacitance to ground, which results in low touch driving frequency of the touch display panel, and thus, the existing touch display panel has low touch accuracy.

SUMMARY OF THE INVENTION

In view of the above problem, the present invention provides an inverting circuit, a driving method thereof, a touch display panel and a touch display panel, to solve the problem that a touch display panel has a touch electrode with high capacitance to ground and thus has low touch accuracy in the prior art.

For this purpose, the present invention provides an inverting circuit, including an input module and an output module;

the input module is connected to a first input terminal, a first voltage terminal, a second voltage terminal, a first signal terminal, a second signal terminal and a first node, respectively, and is used for controlling a potential of the first node according to input signals of the first input terminal, the first voltage terminal, the second voltage terminal, the first signal terminal and the second signal terminal; and the output module is connected to the first node, the first input terminal, a third voltage terminal, a third signal terminal and a first output terminal, respectively, and is used for controlling, under the control of the potential of the first node, an output signal of the first output terminal according to input signals of the first input terminal, the third voltage terminal and the third signal terminal.

Optionally, the input module includes a first transistor, a second transistor and a first capacitor;

a gate of the first transistor is connected to the first input terminal, a first electrode of the first transistor is connected to the first voltage terminal, and a second electrode of the first transistor is connected to the first node;

a gate of the second transistor is connected to the first signal terminal, a first electrode of the second transistor is connected to the first node, and a second electrode of the second transistor is connected to the second voltage terminal; and the first capacitor is connected in parallel between the first node and the second signal terminal.

Optionally, the output module includes a third transistor and a fourth transistor;

a gate of the third transistor is connected to the first input terminal, a first electrode of the third transistor is connected to the third voltage terminal, and a second electrode of the third transistor is connected to the first output terminal; and a gate of the fourth transistor is connected to the first node, a first electrode of the fourth transistor is connected to the first output terminal, and a second electrode of the fourth transistor s connected to the third signal terminal.

The present invention further provides a driving method of an inverting circuit, the inverting circuit includes any one of the above inverting circuits, the first voltage terminal is at a high level, the second voltage terminal is at a low level, the third voltage terminal is at a high level, and the driving method includes:

in a first stage, inputting a high level to the first input terminal, inputting a low level to the first signal terminal, inputting a high level to the second signal terminal, and inputting a low level to the third signal terminal;

in a second stage, inputting a low level to the first input terminal, inputting a high level to the first signal terminal, inputting a low level to the second signal terminal, and inputting a low level to the third signal terminal;

in a third stage, inputting a high level to the first input terminal, inputting a low level to the first signal terminal, inputting a high level to the second signal terminal, and inputting a low level to the third signal terminal;

in a fourth stage, inputting a high level to the first input terminal, inputting a high level to the first signal terminal, inputting a low level to the second signal terminal, and inputting a low level to the third signal terminal; and in a fifth stage, inputting a high level to the first input terminal, inputting a low level to the first signal terminal, inputting a high level to the second signal terminal, and inputting a high level to the third signal terminal.

The present invention further provides a touch display panel including any one of the above inverting circuits, the touch display panel further includes a substrate, a thin film transistor is provided on the substrate, a light-emitting diode is provided on the thin film transistor, the light-emitting diode includes an anode, a light-emitting layer and a cathode, the cathode includes at least one touch electrode, a sense electrode is provided above the touch electrode, and the touch electrode and the sense electrode are arranged perpendicularly to each other to form a touch sensing matrix;

the touch electrode and the sense electrode are applied with touch driving signals in a touch stage; and the anode is applied with no driving signal in the touch stage.

The touch display panel further includes a pixel compensation circuit, which includes a fifth transistor, a sixth transistor, a seventh transistor, an eighth transistor, a ninth transistor and a tenth transistor, a drain of the fifth transistor, a source of the sixth transistor and a gate of the seventh transistor are connected to the second node, a drain of the ninth transistor is connected to a source of the seventh transistor and a drain of the eighth transistor, a drain of the seventh transistor is connected to a source of the tenth transistor, a drain of the tenth transistor is connected to the light-emitting diode, and the output signal from the first output terminal of the inverting circuit is connected to gates of the eighth transistor and the tenth transistor to control the light-emitting diode to emit light.

The touch display panel further includes a shift register circuit, which includes an eleventh transistor, a twelfth transistor, a thirteenth transistor, a fourteenth transistor, a fifteenth transistor, a sixteenth transistor and a seventeenth transistor, a drain of the eleventh transistor is connected to a gate of the fifteenth transistor, a gate of the twelfth transistor and a drain of the seventeenth transistor, a drain of the thirteenth transistor is connected to a gate of the fourteenth transistor, a source of the twelfth transistor and a gate of the sixteenth transistor, and a drain of the fourteenth transistor is connected to a source of the fifteenth transistor, and provides an input signal for inputting to the first input terminal of the inverting circuit.

Optionally, the thin film transistor includes a gate, an active layer, a source and a drain, the anode is connected to the drain; and the anode and the cathode are configured to be applied with display driving signals in a display stage.

Optionally, the touch display panel further includes package glass and protective glass, the package glass is provided between the sense electrode and the touch electrode, and the protective glass is provided on the sense electrode.

Optionally, the touch electrode is strip-shaped.

The present invention further provides a touch display device, including any one of the above touch display panels.

The present invention has the beneficial effects as follows.

In the inverting circuit, the driving method thereof, the touch display panel and the touch display device provided by the present invention, the inverting circuit includes an input module and an output module, the input module is used for controlling a potential of the first node according to input signals of the first input terminal, the first voltage terminal, the second voltage terminal, the first signal terminal and the second signal terminal, and the output module is used for controlling, under the control of the potential of the first node, an output signal of the first output terminal according to input signals of the first input terminal, the third voltage terminal and the third signal terminal. In the technical solutions provided by the present invention, a light-emitting control signal is switched off in a touch stage by means of time-sharing driving to lower the capacitance to ground of the touch electrode, so that resistive and capacitive load of the touch electrode is reduced, touch driving frequency is increased, and touch accuracy is thus improved.

DETAILED DESCRIPTION OF THE EMBODIMENTS

To make those skilled in the art better understand the technical solutions of the present invention, an inverting circuit, a driving method thereof, a touch display panel, and a touch display device provided by the present invention are described in detail below in conjunction with the accompanying drawings.

First Embodiment

Figure 1:
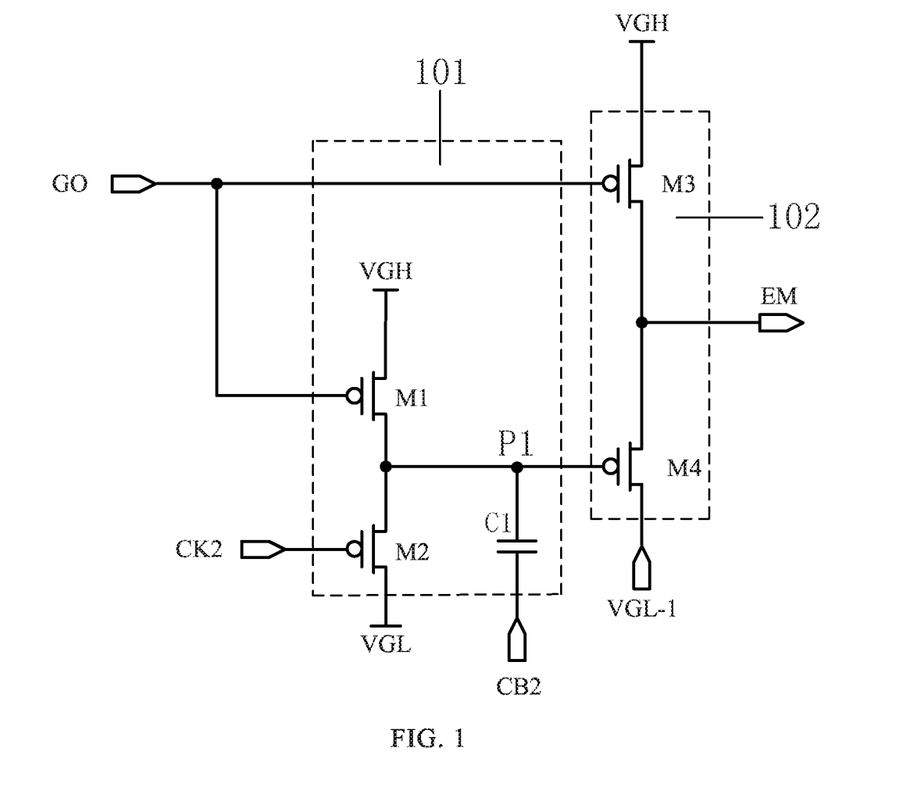
FIG. 1 is a schematic structural diagram of an inverting circuit provided by a first embodiment of the present invention.

FIG. 1 is a schematic structural diagram of an inverting circuit provided by a first embodiment of the present invention. As shown in FIG. 1, the inverting circuit includes an input module 101 and an output module 102. The input module 101 is connected to a first input terminal GO, a first voltage terminal VGH, a second voltage terminal VGL, a first signal terminal CK2, a second signal terminal CB2 and a first node P1, respectively. The input module 101 is used for controlling a potential of the first node P1 according to input signals of the first input terminal GO, the first voltage terminal VGH, the second voltage terminal VGL, the first signal terminal CK2 and the second signal terminal CB2. The output module 102 is connected to the first node P1, the first input terminal GO, a third voltage terminal VGH, a third signal terminal VGL-1 and a first output terminal EM, respectively. The output module 102 is used for controlling, under the control of the potential of the first node P1, an output signal of the first output terminal EM according to input signals of the first input terminal GO, the third voltage terminal VGH and the third signal terminal VGL-1. In the inverting circuit provided by the present embodiment, a light-emitting control signal is switched off in a touch stage by means of time-sharing driving, to lower capacitance to ground of a touch electrode, so that resistive and capacitive load of the touch electrode is reduced, touch driving frequency is increased, and touch accuracy is thus improved.

Referring to FIG. 1, the input module 101 includes a first transistor M1, a second transistor M2 and a first capacitor C1. A gate of the first transistor M1 is connected to the first input terminal GO, a first electrode of the first transistor M1 is connected to the first voltage terminal VGH, and a second electrode of the first transistor M1 is connected to the first node P1. A gate of the second transistor M2 is connected to the first signal terminal CK2, a first electrode of the second transistor M2 is connected to the first node P1, and a second electrode of the second transistor M2 is connected to the second voltage terminal VGL. The first capacitor C1 is connected in parallel between the first node P1 and the second signal terminal CB2.

Referring to FIG. 1, the output module 102 includes a third transistor M3 and a fourth transistor M4. A gate of the third transistor M3 is connected to the first input terminal GO, a first electrode of the third transistor M3 is connected to the third voltage terminal VGH, and a second electrode of the third transistor M3 is connected to the first output terminal EM. A gate of the fourth transistor M4 is connected to the first node P1, a first electrode of the fourth transistor M4 is connected to the first output terminal EM, and a second electrode of the fourth transistor M4 is connected to the third signal terminal VGL-1.

Figure 2:
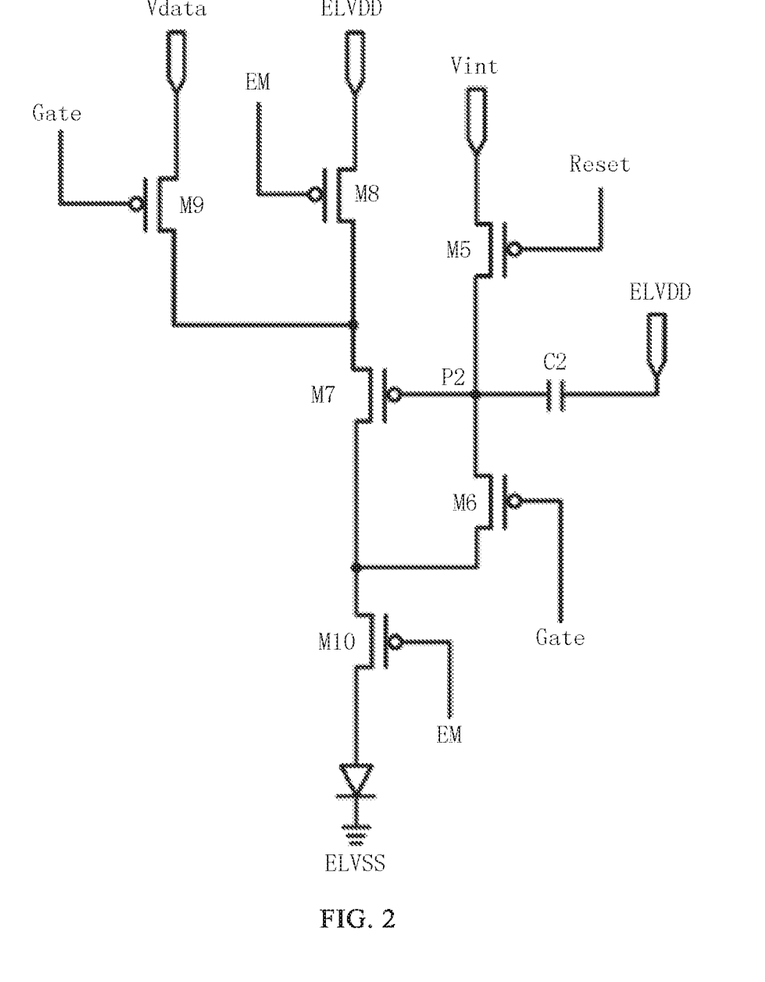
FIG. 2 is a schematic structural diagram of a pixel compensation circuit provided by the first embodiment of the present invention.
Figure 3:
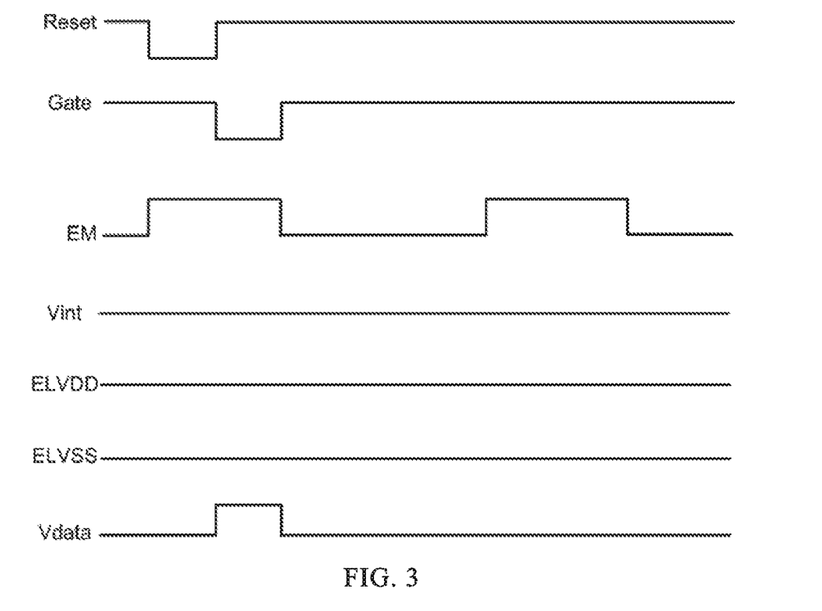
FIG. 3 is an operation timing diagram of the pixel compensation circuit shown in FIG. 2.

FIG. 2 is a schematic structural diagram of a pixel compensation circuit provided by the first embodiment of the present invention, and FIG. 3 is an operation timing diagram of the pixel compensation circuit shown in FIG. 2. The pixel compensation circuit includes a fifth transistor M5, a sixth transistor M6, a seventh transistor M7, an eighth transistor M8, a ninth transistor M9 and a tenth transistor M10. A drain of the fifth transistor M5, a source of the sixth transistor M6 and a gate of the seventh transistor M7 are connected to the second node P2, a drain of the ninth transistor M9 is connected to a source of the seventh transistor M7 and a drain of the eighth transistor M8, a drain of the seventh transistor M7 is connected to a source of the tenth transistor M10, a drain of the tenth transistor M10 is connected to a light-emitting diode, and the output signal from the first output terminal EM of the inverting circuit is connected to gates of the eighth transistor M8 and the tenth transistor M10 to control the light-emitting diode to emit light. As shown in FIGS. 2 and 3, the transistor M7 is a driving transistor and the other transistors are switching transistors. Specifically, in a reset stage, the voltage signal Reset is at a low level, the voltage signal Gate is at a high level, the voltage signal EM is at a high level, the voltage signal Vint is at a low level, the voltage signal ELVDD is at a low level, the voltage signal ELVSS is at a low level, and the voltage signal Vdata is at a low level. At this moment, the transistor M5 is turned on, and the other transistors are turned off, and thus voltage at the node P2 is reset.

In a buffer stage, the voltage signal Reset is at a high level, the voltage signal Gate is at a low level, the voltage signal EM is at a high level, the voltage signal Vint is at a low level, the voltage signal ELVDD is at a low level, the voltage signal ELVSS is at a low level, and the voltage signal Vdata is at a high level. At this moment, the transistors M6, M7 and M9 are turned on, the transistors M5, M8 and M10 are turned off, and as the driving transistor M7 is turned on, the voltage signal Vdata charges the second node P2, so that the voltage at the second node P2 is Vdata−Vth.

In a light-emitting stage, the voltage signal Reset is at a high level, the voltage signal Gate is at a high level, the voltage signal EM is at a low level, the voltage signal Vint is at a low level, the voltage signal ELVDD is at a low level, the voltage signal ELVSS is at a low level, and the voltage signal Vdata is at a low level. At this moment, the transistors M7, M8 and M10 are turned on, and the light-emitting device OLED starts to emit light.

The working current $I_{OLED}$ of the light-emitting device OLED can be obtained from the following saturation current formula, of the thin film transistor:

$$I_{OLED} = K(V_{GS} - V_{th})^2$$
$$= K[V_{dd} - (V_{data} - V_{th}) - V_{th}]^2$$
$$= K(V_{dd} - V_{data})^2$$

It can be seen that, the working current $I_{OLED}$ is not influenced by the threshold voltage $V_{th}$, but only related to the voltage signals $V_{dd}$ and $V_{data}$, so that the problem of drift of the threshold voltage $V_{th}$ of the driving transistor is solved, the influence of the threshold voltage $V_{th}$ on the working current $I_{OLED}$ is eliminated, and normal operation of the light-emitting device OLED is ensured.

In a control stage, the voltage signal Reset is at a high level, the voltage signal Gate is at a high level, the voltage signal EM is at a high level, the voltage signal Vint is at a low level, the voltage signal ELVDD is at a low level, the voltage signal ELVSS is at a low level, and the voltage signal Vdata is at a low level. At this moment, the transistors M8 and M10 are turned off, and a cathode (touch electrode) starts to be applied with a touch driving signal. At this point, no driving signal is applied to the anode to reduce the capacitance to ground of the touch electrode, so that resistive and capacitive load of the touch electrode is reduced, touch driving frequency is increased, and touch accuracy is thus improved.

Figure 4:
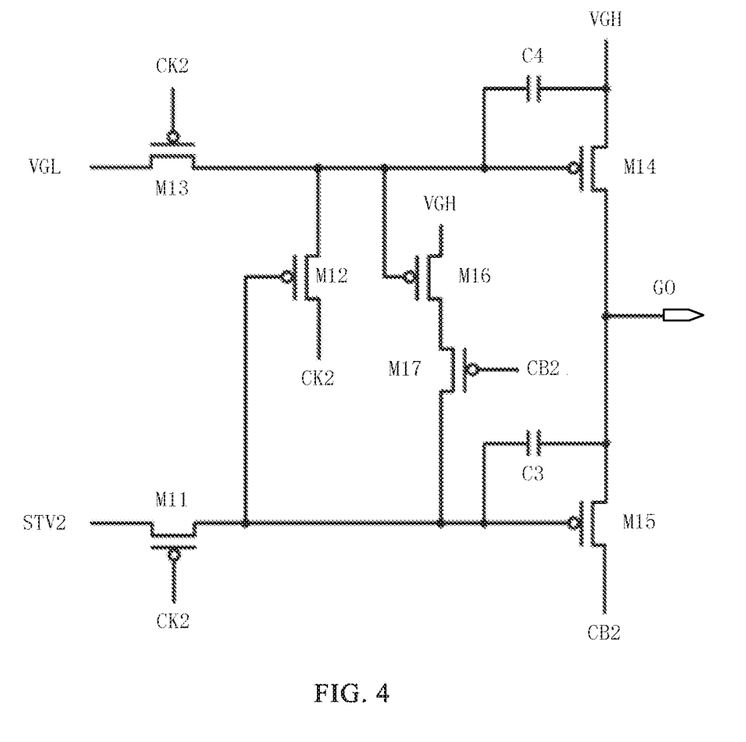
FIG. 4 is a schematic structural diagram of a shift register circuit provided by the first embodiment of the present invention.
Figure 5:
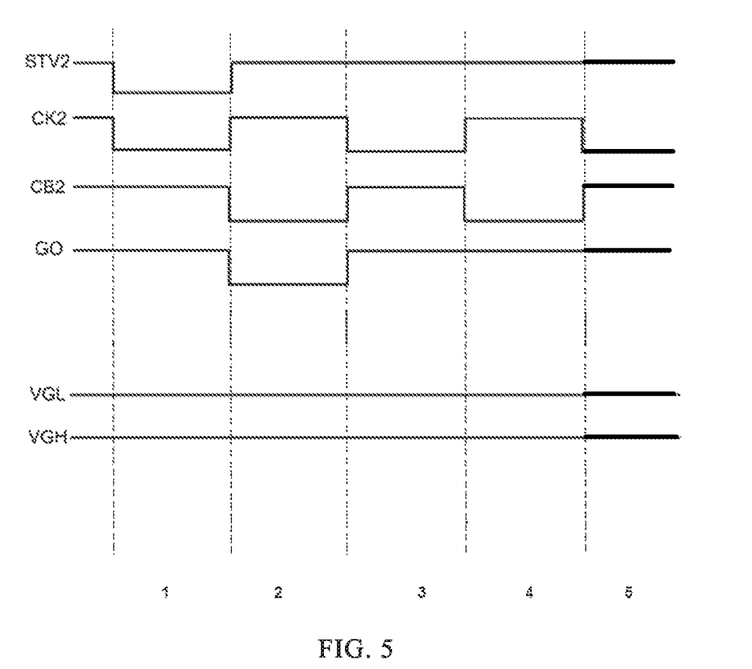
FIG. 5 is an operation timing diagram of the shift register circuit shown in FIG. 4.

FIG. 4 is a schematic structural diagram of a shift register circuit provided by the first embodiment of the present invention, and FIG. 5 is an operation timing diagram of the shift register circuit shown in FIG. 4. The shift register circuit includes an eleventh transistor M11, a twelfth transistor M12, a thirteenth transistor M13, a fourteenth transistor M14, a fifteenth transistor M15, a sixteenth transistor M16 and a seventeenth transistor M17. A drain of the eleventh transistor M11 is connected to a gate of the fifteenth transistor M15, a gate of the twelfth transistor M12 and a drain of the seventeenth transistor M17, a drain of the thirteenth transistor M13 is connected to a gate of the fourteenth transistor M14, a source of the twelfth transistor M12 and a gate of the sixteenth transistor M16, and a drain of the fourteenth transistor M14 is connected to a source of the fifteenth transistor M15 and provides an input signal for inputting to the first input terminal G0 of the inverting circuit. As shown in FIGS. 4 and 5, in a first process: when the voltage signal STV2 is at a low level, the voltage signal CK2 is at a low level, and the voltage signal CB2 is at a high level, the output signal G0 is at a high level; in a second process, when the voltage signal STV2 is at a high level, the voltage signal CK2 is at a high level, and the voltage signal CB2 is at a low level, the output signal G0 is at a low level; in a third process, when the voltage signal STV2 is at a high level, the voltage signal CK2 is at a low level, and the voltage signal CB2 is at a high level, the output signal G0 is at a high level; in a fourth process, when the voltage signal STV2 is at a high level, the voltage signal CK2 is at a high level, and the voltage signal CB2 is at a low level, the output signal G0 is at a high level; and in a fifth process, when the voltage signal STV2 is at a high level, the voltage signal CK2 is at a low level, and the voltage signal CB2 is at a high level, the output signal G0 is at a high level.

The inverting circuit provided by the embodiment includes an input module and an output module, the input module is used for controlling a potential of the first node according to input signals of the first input terminal, the first voltage terminal, the second voltage terminal, the first signal terminal and the second signal terminal, and the output module is used for controlling, under the control of the potential of the first node, an output signal of the first output terminal according to input signals of the first input terminal, the third voltage terminal and the third signal terminal. In the technical solution provided by the embodiment, a light-emitting control signal is switched off in a touch stage by means of time-sharing driving to lower the capacitance to ground of the touch electrode, so that resistive and capacitive load of the touch electrode is reduced, touch driving frequency is increased, and touch accuracy is thus improved.

Second Embodiment

Figure 6:
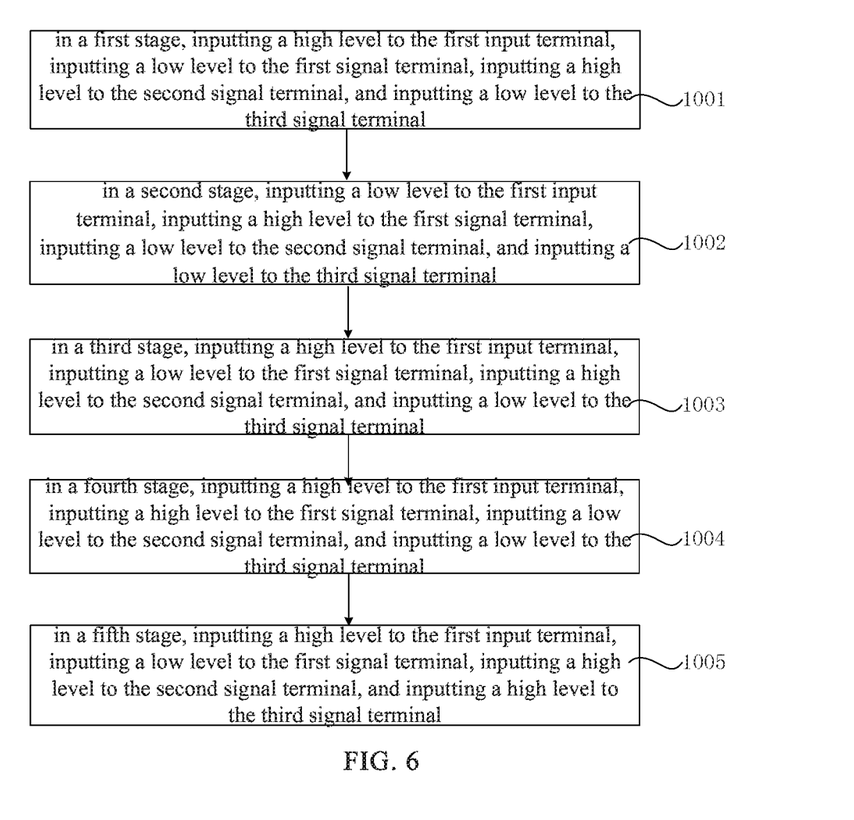
FIG. 6 is a flowchart of a driving method of an inverting circuit provided by a second embodiment of the present invention.
Figure 7:
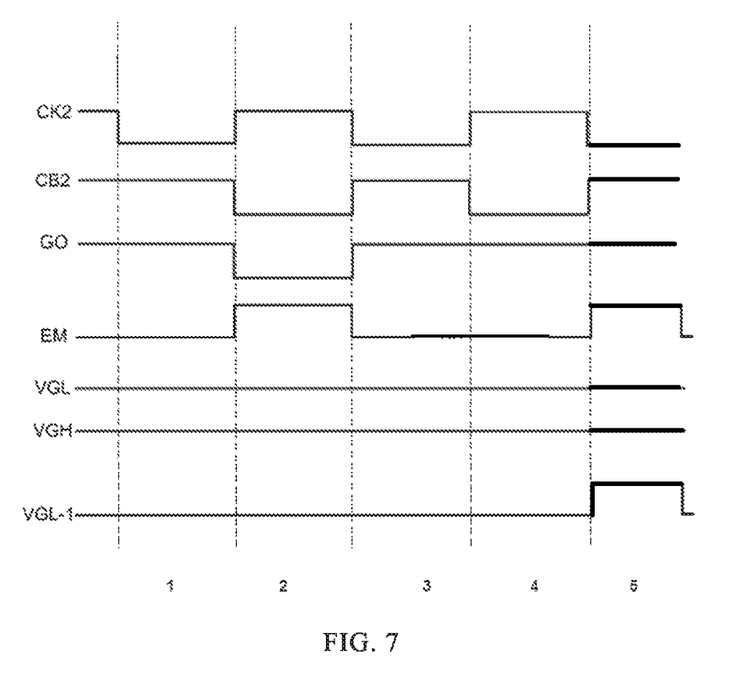
FIG. 7 is an operation timing diagram of an inverting circuit provided by the second embodiment of the present invention.

FIG. 6 is a flowchart of a driving method of an inverting circuit provided by a second embodiment of the present invention, and FIG. 7 is an operation timing diagram of an inverting circuit provided by the second embodiment of the present invention. As shown in FIGS. 6 and 7, the inverting circuit includes the inverting circuit provided in the first embodiment. For the specific contents of the inverting circuit, reference may be made to the description of the first embodiment, and redundant description will not be given here.

In this embodiment, the first voltage terminal VGH is at a high level, the second voltage terminal VGL is at a low level, the third voltage terminal VGH is at a high level, and the driving method of the inverting circuit includes steps as follows.

Step 1001 includes: in a first stage, inputting a high level to the first input terminal, inputting a low level to the first signal terminal, inputting a high level to the second signal terminal, and inputting a low level to the third signal terminal.

In this embodiment, the first input terminal GO is applied with a high level, the first signal terminal CK2 is applied with a low level, the second signal terminal CB2 is applied with a high level, and the third signal terminal VGL-1 is applied with a low level. At this point, the first transistor M1 is turned off, the second transistor M2 is turned on, the first node P1 is at a low level, the fourth transistor M4 is turned on, the third transistor M3 is turned off, and the first output terminal EM outputs a low level.

Step 1002 includes: in a second stage, inputting a low level to the first input terminal, inputting a high level to the first signal terminal, inputting a low level to the second signal terminal, and inputting a low level to the third signal terminal.

In this embodiment, the first input terminal GO is applied with a low level, the first signal terminal CK2 is applied with a high level, the second signal terminal CB2 is applied with a low level, and the third signal terminal VGL-1 is applied with a low level. At this point, the first transistor M1 is turned on, the second transistor M2 is turned off, the first node P1 is at a high level, the fourth transistor M4 is turned off, the third transistor M3 is turned on, and the first output terminal EM outputs a high level.

Step 1003 includes: in a third stage, inputting a high level to the first input terminal, inputting a low level to the first signal terminal, inputting a high level to the second signal terminal, and inputting a low level to the third signal terminal.

In this embodiment, the first input terminal GO is applied with a high level, the first signal terminal CK2 is applied with a low level, the second signal terminal CB2 is applied with a high level, and the third signal terminal VGL-1 is applied with a low level. At this point, the first transistor M1 is turned off, the second transistor M2 is turned on, the first node P1 is at a low level, the fourth transistor M4 is turned on, the third transistor M3 is turned off, and the first output terminal EM outputs a low level.

Step 1004 includes: in a fourth stage, inputting a high level to the first input terminal, inputting a high level to the first signal terminal, inputting a low level to the second signal terminal, and inputting a low level to the third signal terminal.

In this embodiment, the first input terminal GO is applied with a high level, the first signal terminal CK2 is applied with a high level, the second signal terminal CB2 is applied with a low level, and the third signal terminal VGL-1 is applied with a low level. At this point, the first transistor M1 is turned off, the second transistor M2 is turned off, the first node P1 remains at a low level, the fourth transistor M4 is turned on, the third transistor M3 is turned off, and the first output terminal EM outputs a low level.

Step 1005 includes: in a fifth stage, inputting a high level to the first input terminal, inputting a low level to the first signal terminal, inputting a high level to the second signal terminal, and inputting a high level to the third signal terminal.

In this embodiment, the first input terminal GO is applied with a high level, the first signal terminal CK2 is applied with a low level, the second signal terminal CB2 is applied with a high level, and the third signal terminal VGL-1 is applied with a high level. At this point, the first transistor M1 is turned off, the second transistor M2 is turned on, the first node P1 is at a low level, the fourth transistor M4 is turned on, the third transistor M3 is turned off, and the first output terminal EM outputs a high level. The fifth stage is a control stage, the cathode (touch electrode) starts to be applied with a touch driving signal, and no driving signal is applied to the anode to reduce the capacitance to ground of the touch electrode, so that resistive and capacitive load of the touch electrode is reduced, touch driving frequency is increased, and touch accuracy is thus improved.

In the driving method of an inverting circuit provided by the embodiment, the inverting circuit includes an input module and an output module, the input module is used for controlling a potential of the first node according to input signals of the first input terminal, the first voltage terminal, the second voltage terminal, the first signal terminal and the second signal terminal, and the output module is used for controlling, under the control of the potential of the first node, an output signal of the first output terminal according to input signals of the first input terminal, the third voltage terminal and the third signal terminal. In the technical solution provided by the embodiment, a light-emitting control signal is switched off in a touch stage by means of time-sharing driving to lower the capacitance to ground of the touch electrode, so that resistive and capacitive load of the touch electrode is reduced, touch driving frequency is increased, and touch accuracy is thus improved.

Third Embodiment

Figure 8:
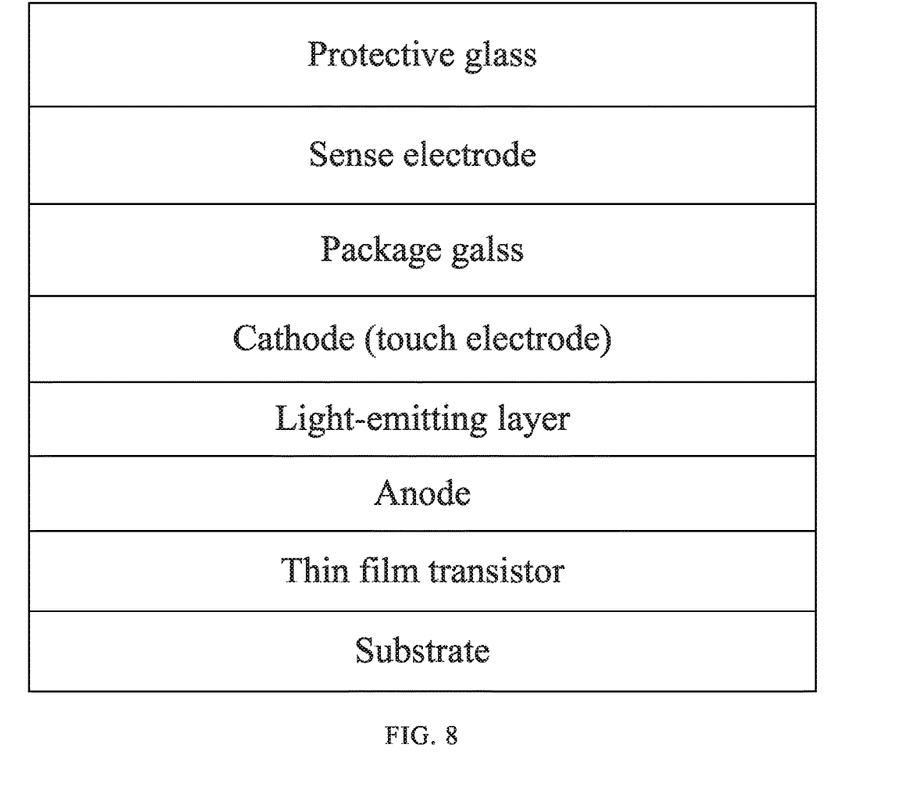
FIG. 8 is a schematic structural diagram of a touch display panel provided by a third embodiment of the present invention.

FIG. 8 is a schematic structural diagram of a touch display panel provided by a third embodiment of the present invention. As shown in FIG. 8, the touch display panel includes the inverting circuit provided in the first embodiment. For the specific contents of the inverting circuit, reference may be made to the description of the first embodiment, and redundant description will not be given here.

Referring to FIG. 8, the touch display panel includes a substrate, a thin film transistor is provided on the substrate, a light-emitting diode is provided on the thin film transistor, and includes an anode, a light-emitting layer and a cathode, the cathode includes at least one touch electrode, a sense electrode is provided above the touch electrode, and the touch electrode and the sense electrode are perpendicular to each other to form a touch sensing matrix.

In this embodiment, the touch electrode and the sense electrode are arranged perpendicularly to each other to form a dual layer structure. Leads are provided in the peripheries of the touch electrode and the sense electrode, respectively to connect the touch electrode and the sense electrode to a control circuit. In practical applications, when no conductive object approaches, the electrodes have a fixed coupling capacitance therebetween, at this point, an electric filed between the electrodes is stationarily distributed, and the control circuit monitors the value of the coupling capacitance. When a human finger comes into contact with the touch display panel, the electric field stationarily distributed at each electrode is changed due to the touch with the finger, and a new capacitance is formed at the touch point, and thus the capacitance value at the touch point is changed. The control circuit detects the change in capacitance value at the touch point, and can thus position the touch point, thereby realizing the touch-control function.

Referring to FIG. 8, the touch display panel further includes package glass and protective glass, the package glass is provided between the sense electrode and the touch electrode, and the protective glass is provided above the sense electrode. In the embodiment, the cathode is divided to form a touch electrode, and the touch electrode is strip-shaped.

In the display stage, the anode and the cathode are applied with display driving signals to achieve a display function. In the touch stage, the touch electrode (cathode) and the sense electrode are applied with touch driving signals, and no driving signal is applied to the anode to lower the capacitance to ground of the touch electrode, so that resistive and capacitive load of the touch electrode is reduced, touch driving frequency is increased, and touch accuracy is thus improved.

In the touch display panel provided by the embodiment, the inverting circuit includes an input module and an output module, the input module is used for controlling a potential of the first node according to input signals of the first input terminal, the first voltage terminal, the second voltage terminal, the first signal terminal and the second signal terminal, and the output module is used for controlling, under the control of the potential of the first node, an output signal of the first output terminal according to input signals of the first input terminal, the third voltage terminal and the third signal terminal. In the technical solution provided by the embodiment, a light-emitting control signal is switched off in a touch stage by means of time-sharing driving to lower the capacitance to ground of the touch electrode, so that resistive and capacitive load of the touch electrode is reduced, touch driving frequency is increased, and touch accuracy is thus improved.

Fourth Embodiment

The present embodiment provides a touch display device including the touch display panel provided in the third embodiment. For the specific contents of the touch display panel, reference may be made to the description of the third embodiment, and redundant description will not be given here.

In the touch display device provided in the embodiment, the inverting circuit includes an input module and an output module, the input module is used for controlling a potential of the first node according to input signals of the first input terminal, the first voltage terminal, the second voltage terminal, the first signal terminal and the second signal terminal, and the output module is used for controlling, under the control of the potential of the first node, an output signal of the first output terminal according to input signals of the first input terminal, the third voltage terminal and the third signal terminal. In the technical solution provided by the embodiment, a light-emitting control signal is switched off in a touch stage by means of time-sharing driving to lower the capacitance to ground of the touch electrode, so that resistive and capacitive load of the touch electrode is reduced, touch driving frequency is increased, and touch accuracy is thus improved.

It could be understood that the above embodiments are only exemplary embodiments adopted to illustrate the principle of the present invention, but the present invention is not limited thereto. Various variations and improvements may be made by those of ordinary skill in the art without departing from the spirit and essence of the present invention, and these variations and improvements are also regarded as falling within the protection scope of the present invention.

The invention claimed is:

1. An inverting circuit, including an input module and an output module, wherein
the input module is connected to a first input terminal, a first voltage terminal, a second voltage terminal, a first signal terminal, a second signal terminal and a first node, respectively, and is used for controlling a potential of the first node according to input signals of the first input terminal, the first voltage terminal, the second voltage terminal, the first signal terminal and the second signal terminal;
the output module is connected to the first node, the first input terminal, a third voltage terminal, a third signal terminal and a first output terminal, respectively, and is used for controlling, under the control of the potential of the first node, an output signal of the first output terminal according to input signals of the first input terminal, the third voltage terminal and the third signal terminal; and
the second voltage terminal is provided with a low level signal, and the third signal terminal is provided with a high level signal and a low level signal in a time sharing manner.

2. The inverting circuit according to claim 1, wherein the input module includes a first transistor, a second transistor and a first capacitor;
a gate of the first transistor is connected to the first input terminal, a first electrode of the first transistor is connected to the first voltage terminal, and a second electrode of the first transistor is connected to the first node;
a gate of the second transistor is connected to the first signal terminal, a first electrode of the second transistor is connected to the first node, and a second electrode of the second transistor is connected to the second voltage terminal; and
the first capacitor is connected in parallel between the first node and the second signal terminal.

3. The inverting circuit according to claim 1, wherein the output module includes a third transistor and a fourth transistor;
a gate of the third transistor is connected to the first input terminal, a first electrode of the third transistor is connected to the third voltage terminal, and a second electrode of the third transistor is connected to the first output terminal; and
a gate of the fourth transistor is connected to the first node, a first electrode of the fourth transistor is connected to the first output terminal, and a second electrode of the fourth transistor is connected to the third signal terminal.

4. A driving method of an inverting circuit, wherein the inverting circuit is the inverting circuit according to claim 1, the first voltage terminal is at a high level, the second voltage terminal is at a low level, the third voltage terminal is at a high level, and the driving method includes:
in a first stage, inputting a high level to the first input terminal, inputting a low level to the first signal terminal, inputting a high level to the second signal terminal, and inputting a low level to the third signal terminal;
in a second stage, inputting a low level to the first input terminal, inputting a high level to the first signal terminal, inputting a low level to the second signal terminal, and inputting a low level to the third signal terminal;

in a third stage, inputting a high level to the first input terminal, inputting a low level to the first signal terminal, inputting a high level to the second signal terminal, and inputting a low level to the third signal terminal;

in a fourth stage, inputting a high level to the first input terminal, inputting a high level to the first signal terminal, inputting a low level to the second signal terminal, and inputting a low level to the third signal terminal; and in a fifth stage, inputting a high level to the first input terminal, inputting a low level to the first signal terminal, inputting a high level to the second signal terminal, and inputting a high level to the third signal terminal.

5. A touch display panel, including an inverting circuit including an input module and an output module, wherein the input module is connected to a first input terminal, a first voltage terminal, a second voltage terminal, a first signal terminal, a second signal terminal and a first node, respectively, and is used for controlling a potential of the first node according to input signals of the first input terminal, the first voltage terminal, the second voltage terminal, the first signal terminal and the second signal terminal;

the output module is connected to the first node, the first input terminal, a third voltage terminal, a third signal terminal and a first output terminal, respectively, and is used for controlling, under the control of the potential of the first node, an output signal of the first output terminal according to input signals of the first input terminal, the third voltage terminal and the third signal terminal; and the touch display panel further includes a substrate, a thin film transistor is provided on the substrate, a light-emitting diode is provided on the thin film transistor, and includes an anode, a light-emitting layer and a cathode, the cathode includes at least one touch electrode, a sense electrode is provided above the touch electrode, and the touch electrode and the sense electrode are arranged perpendicularly to each other to form a touch sensing matrix; wherein the touch electrode and the sense electrode are applied with touch driving signals in a touch stage; and the anode of the light-emitting diode is applied with no driving signal in the touch stage.

6. The touch display panel according to claim 5, further including a pixel compensation circuit, which includes a fifth transistor, a sixth transistor, a seventh transistor, an eighth transistor, a ninth transistor and a tenth transistor, wherein a drain of the fifth transistor, a source of the sixth transistor and a gate of the seventh transistor are connected to the second node, a drain of the ninth transistor is connected to a source of the seventh transistor and a drain of the eighth transistor, a drain of the seventh transistor is connected to a source of the tenth transistor, a drain of the tenth transistor is connected to the light-emitting diode, and the output signal from the first output terminal of the inverting circuit is connected to gates of the eighth transistor and the tenth transistor to control the light-emitting diode to emit light.

7. A touch display device, including the touch display panel according to claim 6.

8. The touch display panel according to claim 5, further including a shift register circuit, which includes an eleventh transistor, a twelfth transistor, a thirteenth transistor, a fourteenth transistor, a fifteenth transistor, a sixteenth transistor and a seventeenth transistor, wherein a drain of the eleventh transistor is connected to a gate of the fifteenth transistor, a gate of the twelfth transistor and a drain of the seventeenth transistor, a drain of the thirteenth transistor is connected to a gate of the fourteenth transistor, a source of the twelfth transistor and a gate of the sixteenth transistor, and a drain of the fourteenth transistor is connected to a source of the fifteenth transistor, and provides an input signal for inputting to the first input terminal of the inverting circuit.

9. A touch display device, including the touch display panel according to claim 8.

10. The touch display panel according to claim 5, wherein the thin film transistor includes a gate, an active layer, a source and a drain, and the anode is connected to the drain; and the anode and the cathode are configured to be applied with display driving signals in a display stage.

11. The touch display panel according to claim 5, further including package glass and protective glass, wherein the package glass is provided between the sense electrode and the touch electrode, and the protective glass is provided on the sense electrode.

12. The touch display panel according to claim 5, wherein the touch electrode is strip-shaped.

13. A touch display device, including the touch display panel according to claim 5.

* * * * *